United States Patent
Dourish et al.

(10) Patent No.: US 6,253,217 B1
(45) Date of Patent: Jun. 26, 2001

(54) ACTIVE PROPERTIES FOR DYNAMIC DOCUMENT MANAGEMENT SYSTEM CONFIGURATION

(75) Inventors: James P. Dourish; Warren K. Edwards, both of San Francisco; Anthony G. LaMarca, Redwood City; John O. Lamping, Los Altos; Karin Petersen, Palo Alto; Michael P. Salisbury, Mountain View; Douglas B. Terry, San Carlos; James D. Thornton, Redwood City, all of CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/144,231

(22) Filed: Aug. 31, 1998

(51) Int. Cl.$^7$ .................................................... G06F 15/00

(52) U.S. Cl. ................................ 707/500; 713/1; 713/100

(58) Field of Search .................................. 707/524, 511, 707/517, 500, 522, 523, 200, 516, 515; 717/11; 713/1, 100; 709/220–222

(56) References Cited

U.S. PATENT DOCUMENTS

| 5,517,655 | * | 5/1996 | Collins et al. ......................... 395/800 |
| 5,860,073 | * | 1/1999 | Ferrel et al. ........................... 707/522 |
| 5,872,974 | * | 2/1999 | Mezick ..................................... 717/1 |
| 5,892,909 | * | 4/1999 | Grasso et al. .................... 395/200.31 |
| 6,023,714 | * | 2/2000 | Hill et al. ............................... 707/513 |
| 6,122,649 | * | 2/1999 | Kanerva et al. ...................... 707/516 |

FOREIGN PATENT DOCUMENTS

WO 91 14222    9/1991  (WO) .

OTHER PUBLICATIONS

Bier, Eric A., "EmbeddedButtons: Supporting Buttons in Documents", ACM Transactions on Information Systems, vol. 10, No. 4, pp. 381–407, Oct. 1992.*

Bier,. Eric A., "EmbeddedButtons: Supporting Buttons in Documents", Proceedings of the fourth annual ACM symposium on User Interface Software and Technology, pp. 45–53, Nov. 1991.*

Benford, et al, "Informing the Design of Collaborative Virtual Environments", Proceedings of the ACM SIGGROUP Conference on Supporting Group Work: The Integration Challenge, pp. 71–80, Nov. 1997.*

Calvary, et al, "From Single–User Architectural Design to PAC*: A Generic Software Architectural Model for CSCW", Proceedings of the Conference on Human Factors and Computer Systems, pp. 42–249, Mar. 1997.*

Dewan, Presun, et al, "Flexible User Interface Coupling in a Collaborative System", Proceedings on Conference on Human Factors and Computing Systems, pp. 41–48, May 1991.*

(List continued on next page.)

Primary Examiner—Joseph H. Feild
(74) Attorney, Agent, or Firm—Fay, Sharpe, Fagan, Minnich & McKee, LLP

(57) ABSTRACT

A document management system is provided which organizes, stores and retrieves documents according to properties attached to the documents. A property attachment mechanism allows a user to attach arbitrary static and active properties to a document. The active properties include executable code which dynamically change system configuration of the document in response to a triggering event which is predefined by the user. The present invention eliminates the generally tedious and error-prone process of configuring and reconfiguring an existing system configuration in response to new or changing user needs.

6 Claims, 5 Drawing Sheets

OTHER PUBLICATIONS

Dewan, Presun, et al, "A High–Level and Flexible Framework for Implementing Multiuser Interfaces", ACM Transactions on Information Systems, vol. 10, No. 4, pp. 345–380, Oct. 1992.*

Interposition Agents: Transparently Interposing User Code at the System Interface, Michael B. Jones, (Microsoft Research, Microsoft Corp.) Proceedings of the 14th ACM Symposium on Operating System Principles, pp. 80–90; 1993.

Lifestreams: Organizing Your Electronic Life, Freeman et al., (Yale University, Dept of Computer Science) Proceedings of the CHI 96 Conference Companion on Human Factors in Computing Systems, pp. 410–411; 1996.

The Digital Library Integrated Task Enironment (DLITE), Cousins et al., (Stanford University / Xerox PARC) Jul. 1997.

Semantic File Systems, Gifford et al., (Programming Systems Research Group, 1991 ACM 0–89791–447–3/91/0009/0016).

SLIC: An Extensibility System for Commodity Operating Systems, Ghormley et al., (Computer Science Division, Univ. of CA at Berkeley) Feb. 1998.

Finding and Reminding: File Organization from the Desktop, Barreau et al., (SIGCHI, vol. 27, No. 3, Jul. 1995).

Finding and Reminding, Reconsidered, Fertig et al., (SIGCHI, vol. 28, No. 1, Jan. 1996).

Using a Landscape Metaphor to Represent a Corpus of Documents, Matthew Chalmers, (Rank Xerox EuroPARC, in Proc. European Conf. on Spatial Information Theory, Elba, Sep. 1993).

Semantic File Systems, Gifford et al., (Programming Systems Research Group, 1991 ACM 0–89791–447–3/91/0009/0016).

A Pile Metaphor for Supporting Casual Organization of Information, Mander et al., (Chi '92, 1992 ACM 0–89791–513–5/92/0005–0627).

Representing Information About Files, Jeffrey Mogul, (Computer Science Dept., Stanford, University, CH2021–4/84/0000/0432$01.00 1984 IEEE).

M. Fredriksson: "Active Documents" Second HK/R Student Conference on Advanced Object–Oriented Concepts, 'Online! Jan. 17, 1997, pp. 1–10.

M. Fredriksson & M. Svahnberg: "Fargo: Technical Description" 'Online! 1997, Unversity College of Kaorlskrona/Ronneby, Ronneby, SE.

G. Starovic, V. Cahill & B. Tangney: "An Event–Based Object Model for Distributed Programming" 'Online! Dec. 1995, Trinity College Dublin, TCD–CS–95–28, Dublin, IE.

* cited by examiner

ACTIVE PROPERTIES FOR DYNAMIC DOCUMENT MANAGEMENT SYSTEM CONFIGURATION

BACKGROUND OF THE INVENTION

The following applications are related to the present invention: U.S. Ser. No. 09/143,802, Anthony G. LaMarca, et al., entitled USER LEVEL ACCESSING OF LOW-LEVEL COMPUTER SYSTEM OPERATIONS; U.S. Ser. No. 09/143,551, Karin Petersen, et al., entitled PROPERTY-BASED USER LEVEL DOCUMENT MANAGEMENT; U.S. Ser. No. 09/143,778, Douglas B. Terry, et al., entitled A PROPERTY-BASED MECHANISM FOR FLEXIBLY SUPPORTING FRONT-END AND BACK-END COMPONENTS HAVING DIFFERENT COMMUNICATION PROTOCOLS; U.S. Ser. No. 09/144,143, Warren K. Edwards, et al., entitled ATOMIC AND MOLECULAR DOCUMENTS; U.S. Ser. No. 09/143,555, Michael P. Salisbury, et al, entitled VIRTUAL DOCUMENTS; U.S. Ser. No. 09/144,383, John O. Lamping, et al, entitled SELF CONTAINED DOCUMENT MANAGEMENT BASED ON DOCUMENT PROPERTIES; U.S. Ser. No. 09/143,773, James D. Thornton, et al., entitled SERVICE INTERACTION USING PROPERTIES ATTACHED TO DOCUMENTS; U.S. Ser. No. 09/143,777, Warren K. Edwards, et al., entitled EXTENDING APPLICATION BEHAVIOR THROUGH DOCUMENT PROPERTIES; U.S. Ser. No. 09/143,772, Michael P. Salisbury, et al., entitled MAINTAINING DOCUMENT IDENTITY ACROSS FILE SYSTEM INTERFACES; U.S. Ser. No. 09/144,032, Anthony G. LaMarca, et al, entitled CLUSTERING RELATED FILES IN A DOCUMENT MANAGEMENT SYSTEM.

Each of the above applications filed Aug. 31, 1998 and assigned to a common assignee are hereby incorporated by reference.

The present invention is directed to document management systems. It finds particular application to a system and method of dynamically changing system configurations for a selected document using active properties attached to the selected document and will be described with particular reference thereto.

The inventors have recognized that a large amount of a user's interaction with a computer has to do with document management, such as storing, filing, organizing and retrieving information from numerous electronic documents. These documents may be found on a local disc, on a network system file server, an e-mail file server, the world wide web, or a variety of other locations. Modern communication delivery systems have had the effect of greatly increasing the flow of documents which may be incorporated within a user's document space, thereby increasing the need for better tools to visualize and interact with the accumulated documents.

The most common tools for organizing a document space rely on a single fundamental mechanism known as hierarchical storage systems, wherein documents are treated as files that exist in directories or folders, which are themselves contained in other directories, thereby creating a hierarchy that provides the structure for document space interactions. Each directory in a hierarchy of directories, will commonly contain a number of individual files. Typically, files and directories are given alpha-numeric, mnemonic names in large storage volumes shared via a network. In such a network, individual users may be assigned specific directories.

A file located in a sub-directory is located by its compound path name. For example, the character string D:\TREE\LIMB\BRANCH\TWIG\LEAF.FIL could describe the location of a file LEAF.FIL whose immediate directory is TWIG and which is located deep in a hierarchy of files on the drive identified by the letter D. Each directory is itself a file containing file name, size, location data, and date and time of file creation or changes.

Navigation through a file system, to a large degree, can be considered as navigation through semantic structures that have been mapped onto the file hierarchy. Such navigation is normally accomplished by the use of browsers and dialog boxes. Thus, when a user traverses through the file system to obtain a file (LEAF.FIL), this movement can be seen not only as a movement from one file or folder to another, but also as a search procedure that exploits features of the documents to progressively focus on a smaller and smaller set of potential documents. The structure of the search is mapped onto the hierarchy provided by the file system, since the hierarchy is essentially the only existing mechanism available to organize files. However, documents and files are not the same thing.

Since files are grouped by directories, associating a single document with several different content groupings is cumbersome. The directory hierarchy is also used to control the access to documents, with access controls placed at every node of the hierarchy, which makes it difficult to grant file access to only one or a few people. In the present invention, separation of a document's inherent identity from its properties, including its membership in various document collections, alleviates these problems.

Other drawbacks include that existing hierarchical file systems provide a "single inheritance" structure. Specifically, files can only be in one place at a time, and so can occupy only one spot in the semantic structure. The use of links and aliases are attempts to improve upon such a limitation. Thus, while a user's conception of a structure by which files should be organized may change over time, the hierarchy described above is fixed and rigid. While moving individual files within such a structure is a fairly straight-forward task, reorganizing large sets of files is much more complicated, inefficient and time consuming. From the foregoing it can be seen that existing systems do not address a user's need to alter a file structure based on categories which change over time. At one moment a user may wish to organize the document space in terms of projects, while at some time in the future the user may wish to generate an organization according to time and/or according to document content. A strict hierarchical structure does not allow management of documents for multiple views in a seamless manner resulting in a decrease in the efficiency of document retrieval.

Existing file systems also support only a single model for storage and retrieval of documents. This means a document is retrieved in accordance with a structure or concepts given to it by its author. On the other hand, a user—who is not the author—may wish to retrieve a document in accordance with a concept or grouping different from how the document was stored.

Further, since document management takes place on a device having computational power, there would be benefits to harnessing the computational power to assist in the organization of the documents. For example, by attaching a spell-checker property to a document, it can extend the read operation of a document so that the content returned to the requesting application will be correctly spelled.

The inventors are aware that others have studied the area of document management/storage systems.

DMA is a proposed standard from AIIM designed to allow document management systems from different vendors to interoperate. The DMA standard covers both client and server interfaces and supports useful functionality including collections, versioning, renditions, and multiple-repository search. A look at the APIs show that DMA objects (documents) can have properties attached to them. The properties are strongly typed in DMA and must be chosen from a limited set (string, int, date . . . ). To allow for rich kinds of properties, one of the allowable property types is another DMA object. A list type is allowed to build up big properties. Properties have a unique IDs in DMA. Among the differences which exist to the present invention, is the properties are attached to documents without differentiation about which user would like to see them; properties are stored in the document repository that provides the DMA interface, not independently from it. Similarly, DMA does not provide support for active properties.

WebDAV is another interface designed to allow an extended uniform set of functionality to be attached with documents available through a web server. WebDAV is a set of extensions to the HTTP 1.1 protocol that allow Web clients to create and edit documents over the Web. It also defines collections and a mechanism for associating arbitrary properties with resources. WebDav also provides a means for creating typed links between any two documents, regardless of media type where previously, only HTML documents could contain links. Compared to the present invention, although WebDAV provides support for collections, these are defined by extension (that is all components have to be explicitly defined); and although it provides arbitrary document properties, these live with the document itself and cannot be independently defined for different users, furthermore there is no support for active properties and are mostly geared toward having ASCII (or XML) values.

DocuShare is a simple document management system built as a web-server by Xerox Corporation. It supports simple collections of documents, limited sets of properties on documents and support for a few non-traditional document types like calendars and bulletin boards. It is primarily geared toward sharing of documents of small, self-defined groups (for the latter, it has support to dynamically create users and their permissions.) DocuShare has notions of content providers, but these are not exchangeable for a document. Content providers are associated with the type of the document being accessed. In DocuShare properties are static, and the list of properties that can be associated with a document depends on the document type. Users cannot easily extend this list. System administrators must configure the site to extend the list of default properties associated with document types, which is another contrast to the present invention. Also, in DocuShare properties can be visible to anyone who has read access for the collection in which the document is in. Properties are tightly bound to documents and it is generally difficult to maintain a personalized set of properties for a document, again a different approach than the one described in the present invention.

An operating system "SPIN" from the University of Washington allows users to inject code into the kernel that is invoked when an appropriate system call or system state occurs. (For example, users can inject code that alters paging decisions.) If it has already been done, their technology could be used to make it possible to inject code into the file system to invoke a user's code on read and write. Among the differences between SPIN and the concepts of present invention are that code injected into SPIN runs at the kernel level and users can only express their behaviors in a restricted, safe language in which it is not possible to do "bad things." As such, expressiveness is limited. On the other hand, the properties in the present invention run at the user level, and can have GUIs call out to third party libraries and in general be far more expressive than a kernel injected spindle. Further, the properties of the present invention are expressed in terms of documents, as in "I attach property X to Document Y." The SPIN system, on the other hand, extends a system call such as "read". The example behaviors mentioned above are more easily mapped into a system such as the present invention in which properties are explicitly attached to individual documents.

Other work which allows operating system calls to be extended into user's code include, the article "Interposition Agents: Transparently Interposing User Code and System Interface," by Michael B. Jones in Proceedings of the $14^{th}$ Symposium on Operating Systems, Principles, Asheville, N.C., December 1993, pages 80–93. The article "SLIC: An Extensibility System for Commodity Operating Systems," by Douglas P. Ghormley, Steven H. Rodriguez, David Petrou, Thomas E. Anderson, which is to appear in the USENIX 1998 Annual Technical Conference, New Orleans, La., June 1998.

Further, the Windows NT (from Microsoft) has a function called "Filter Drivers" which, once installed, can see the accesses made to a file system. Installing filter drivers is a privileged operation, not available to normal users. As such, a user level mechanism, such as the document properties of the present invention and event dispatching architecture would be needed to allow users to express their desired behaviors.

There are also systems which, in a very specific domain, allow users to apply behaviors when documents are accessed. An example is the Tandem e-mail system, which has a "screen cobal" language and has hooks to find out when events occur. This system allows users to code filters to do custom operations when documents arrive and/or are read. One of the differences between this system and the present invention, is that the Tandem system solves the problem in a specific domain and invokes only the user's behaviors when the documents are accessed via the mail application. In the present invention, the behaviors are invoked regardless of the application and regardless of the interface.

The paper, "Finding and Reminding: File Organization From the Desktop", D. Barreau and B. Nardi, SIGCHI Bulletin, 27 (3) July, 1995, reviews filing and retrieval practices and discusses the shortcomings of traditional file and retrieval mechanisms. The paper illustrates that most users do not employ elaborate or deep filing systems, but rather show a preference for simple structures and "location-based searches", exploiting groupings of files (either in folders, or on the computer desktop) to express patterns or relationships between documents and to aid in retrieval.

In response to the Barreau article, the article, "Find and Reminding Reconsidered", by S. Fertig, E. Freeman and D. Gelernter, SIGCHI Bulletin, 28(1) January, 1996, defends deep structure and search queries, observing that location-based retrieval is, "nothing more than a user-controlled logical search." There is, however, one clear feature of location-based searching which adds to a simple logical search—in a location-based system, the documents have been subject to some sort of pre-categorization. Additional structure is then introduced into the space, and this structure is exploited in search and retrieval.

The article "Information Visualization Using 3D Interactive Animation", by G. Robertson, S. Card and J. Mackinlay, Communications of the ACM 36 (4) April, 1993, discusses a location-based structure, an interesting feature is that it is exploited perceptually, rather than cognitively. This moves the burden of retrieval effort from the cognitive to the perceptual system. While this approach may be effective, the information that the systems rely on is content-based, and extracting this information to find the structure can be computationally expensive.

The article "Using a Landscape Metaphor to Represent a Corpus of Documents," Proc. European Conference on Spatial Information Theory, Elba, September, 1993, by M. Chalmers, describes a landscape metaphor in which relative document positions are derived from content similarity metrics. A system, discussed in "Lifestreams: Organizing your Electronic Life", AAAI Fall Symposium: AI Applications in Knowledge Navigation on Retrieval (Cambridge, Mass.), E. Freeman and S. Fertig, November, 1995, uses a timeline as the major organizational resource for managing document spaces. Lifestreams is inspired by the problems of a standard single-inheritance file hierarchy, and seeks to use contextual information to guide document retrieval. However, Lifestreams replaces one superordinate aspect of the document (its location in the hierarchy) with another (its location in the timeline).

The article "Semantic File Systems" by Gifford et al., Proc. Thirteenth ACM Symposium of Operating Systems Principals (Pacific Grove, Calif.) October, 1991, introduces the notion of "virtual directories" that are implemented as dynamic queries on databases of document characteristics. The goal of this work was to integrate an associating search/retrieval mechanism into a conventional (UNIX) file system. In addition, their query engine supports arbitrary "transducers" to generate data tables for different sorts of files. Semantic File System research is largely concerned with direct integration into a file system so that it could extend the richness of command line programming interfaces, and so it introduces no interface features at all other than the file name/query language syntax. In contrast, the present invention is concerned with a more general paradigm based on a distributed, multi-principal property-based system and with how interfaces can be revised and augmented to deal with it; the fact that the present invention can act as a file system is simply in order to support existing file system-based applications, rather than as an end in itself.

DLITE is the Stanford Digital Libraries Integrated Task Environment, which is a user interface for accessing digital library resources as described in "The Digital Library Integrated Task Environment" Technical Report SIDL-WP-1996-0049, Stanford Digital Libraries Project (Palo Alto, Calif.) 1996, by S. Cousins et al. DLITE explicitly reifies queries and search engines in order to provide users with direct access to dynamic collections. The goal of DLITE, however, is to provide a unified interface to a variety of search engines, rather than to create new models of searching and retrieval. So although queries in DLITE are independent of particular search engines, they are not integrated with collections as a uniform organizational mechanism.

Multivalent documents define documents as comprising multiple "layers" of distinct but intimately-related content. Small dynamically-loaded program objects, or "behaviors", activate the content and work in concert with each other and layers of content to support arbitrarily specialized document types. To quote from one of their papers, "A document management infrastructure built around a multivalent perspective can provide an extensible, networked system that supports incremental addition of content, incremental addition of interaction with the user and with other components, reuse of content across behaviors, reuse of behaviors across types of documents, and efficient use of network bandwidth."

Multivalent document behaviors (analogs to properties) extend and parse the content layers, each of which is expressed in some format. Behaviors are tasked with understanding the formats and adding functionality to the document based on this understanding. In many ways, the Multivalent document system is an attempt at creating an infrastructure that can deal with the document format problem by incrementally adding layers of "understanding" of various formats. In contrast, the present invention has an explicit goal of exploring and developing a set of properties that are independent of document format. While properties could be developed that could parse and understand content, it is expected that most will be concerned with underlying storage, replication, security, and ownership attributes of the documents. Included among the differences between the present invention and the Multivalent concepts are that, the Multivalent document system focuses on extensibility as a tool for content presentation and new content-based behaviors; the present invention focuses on extensible and incrementally-added properties as a user-visible notion to control document storage and management.

File systems known as the Andrew File System (AFS), Coda, and Ficus provide a uniform name space for accessing files that may be distributed and replicated across a number of servers. Some distributed file systems support clients that run on a variety of platforms. Some support disconnected file access through caching or replication. For example, Coda provides disconnected access through caching, while Ficus uses replication. Although the immediately described distributed file systems support document (or file) sharing, they have a problem in that a file's hierarchical pathname and its storage location and system behavior are deeply related. The place in the directory hierarchy where a document gets stored generally determines on which servers that file resides.

Distributed databases such as Oracle, SQL Server, Bayou, and Lotus Notes also support shared, uniform access to data and often provide replication. Like some distributed file systems, many of today's commercial databases provide support for disconnected operation and automatic conflict resolution. They also provide much better query facilities than file systems. However, distributed databases suffer the same problems as file systems in that the properties of the data, such as where it is replicated and how it is indexed and so on, are generally associated with the tables in which that data resides. Thus, these properties cannot be flexibly managed and updated. Also, the set of possible properties is not extensible.

A digital library system, known as the Documentum DocPage repository, creates a document space called a "DocBase." This repository stores a document as an object that encapsulates the document's content along with its attributes, including relationships, associated versions, renditions, formats, workflow characteristics, and security. These document objects can be infinitely combined and re-combined on demand to form dynamic configurations of document objects that can come from any source.

DocPage supports organization of documents via folder and cabinet metaphors, and allows searching over both document content and attributes. The system also provides checkin/checkout-style version control, full version histories of documents, and annotations (each with its own attributes and security rules). The system also supports workflow-style features including notification of updates. DocBase uses a replicated infrastructure for document storage (see: http://www.documentum.com).

Among the differences between Documentum DocPage and the present invention are: First, in the present system properties are exposed as a fundamental concept in the infrastructure. Further, the present system provides for a radically extensible document property infrastructure capable of supporting an aftermarket in document attributes. Documentum seems to be rather closed in comparison; the possible attributes a document can acquire are defined a priori by the system and cannot be easily extended. Additionally, Documentum does not have the vision of universal access to the degree of the present invention which supports near-universal access to document meta-data, if not document content. In comparison, the scope of Documentum narrows to document access within a closed setting (a corporate intranet).

In prior systems, the process of configuring, and reconfiguring an existing system configuration in response to new or changing user needs, is generally quite tedious and error-prone. Consider the example of trying to share a newly created file within a project group. The user creating the file needs to place the file on a shared file server, possibly set up an access control group for the project members, set the file's access control list to ensure read access by this group and do the same for the directory in which the file was stored, etc. Each of these steps requires using different interfaces to different system components and likely requires the user to have deep knowledge of how these components operate.

The present invention contemplates a new and improved method and apparatus for changing system configurations for a document and which overcomes the above-referenced problems and others.

SUMMARY OF THE INVENTION

In accordance with one aspect of the present invention, a method of dynamically changing a system configuration and/or parameters which control the manner that a document management system manages a document. A property is attached to the document where the property identifies a desired document management system configuration for the document. Executable code is assigned to the property which dynamically changes the system configuration to include the desired configuration of the document. A triggering event is assigned to the property such that the property invokes the executable code in response to the triggering event. Upon an occurrence of the triggering event, the executable code of the property is invoked and it dynamically changes the system configuration to include the desired configuration of the document.

One advantage of the present invention is that documents are organized, stored and retrieved based on properties attached to documents by a user. The restrictive retrieval/storage system based on names, locations and hierarchial levels is eliminated.

Another advantage of the present invention is that a set of properties is maintained for each user for each document independently from all other users. In this manner, a first user can attach and maintain a set of properties for a first document and a second user can attach and maintain a second set of properties for the same first document without interfering with the first user's properties of the first document. A document is not limited to one set of properties.

Another advantage of the present invention is that by using active properties on documents to configure the underlying systems that manage documents, the process of system configuration for users and system administrators is simplified.

Another advantage of the present invention is that properties are used to express high-level concepts and desired configurations. In this manner, a user is relieved of making specific and precise configuration decisions.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be limitative of the scope of the present invention, wherein.

DETAILED DESCRIPTION OF THE PREFERRED EMBODIMENT

Figure 1:
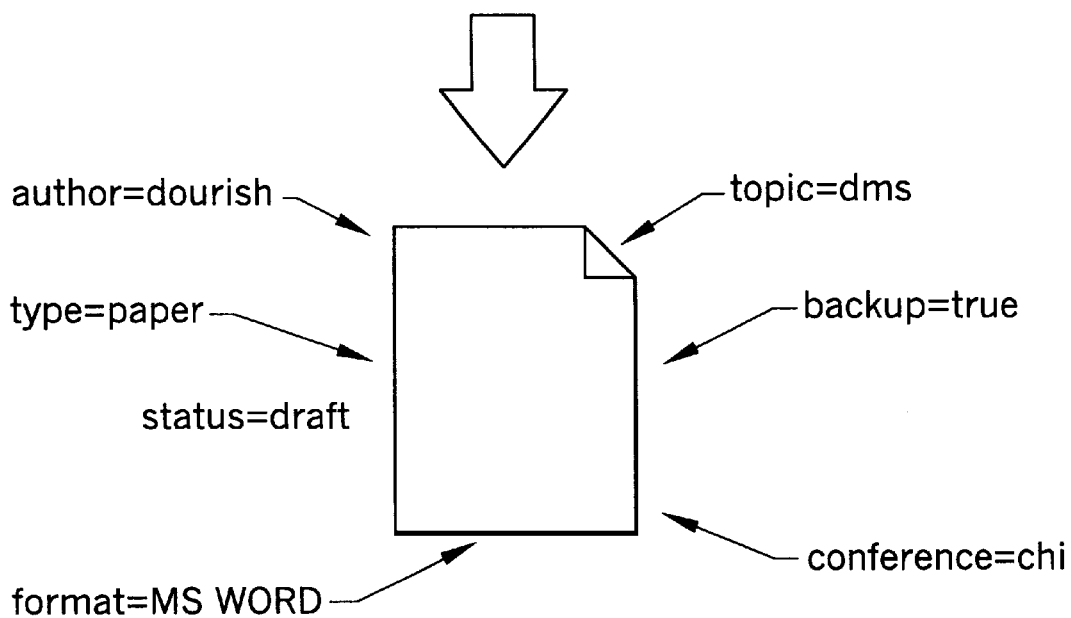
FIG. 1 shows a hierarchical storage mechanism compared to the concept of properties of the present invention.

Prior to discussing the present invention in greater detail, it is believed a glossary of terms used in the description would be beneficial. Therefore, the following definitions are set forth:

Action: The behavior part of a property.

Active Property: A property in which code allows the use of computational power to either alter the document or effect another change within the document management system.

Arbitrary: Ability to provide any property onto a document.

Base Document: Corresponds to the essential bits of a document. There is only one Base Document per document. It is responsible for determining a document's content and may contain properties of the document, and it is part of every principal's view of the document.

Base Properties: Inherent document properties that are associated with a Base Document.

Bit Provider: A special property of the base document. It provides the content for the document by offering read and write operations. It can also offer additional operations such as fetching various versions of the document, or the encrypted version of the content.

Browser: A user interface which allows a user to locate and organize documents.

Collection: A type of document that contains other documents as its content.

Combined Document: A document which includes members of a collection and content.

Content: This is the core information contained within a document, such as the words in a letter, or the body of an e-mail message.

Content Document: A document which has content.

Distributed: Capability of the system to control storage of documents in different systems (i.e., file systems, www, e-mail servers, etc.) in a manner invisible to a user. The system allows for documents located in multi-repositories to be provided to a principal without requiring the principal to have knowledge as to where any of the document's content is stored.

DMS: Document Management System

Document: This refers to a particular content and to any properties attached to the content. The content referred to may be a direct referral or an indirect referral. The smallest element of the DMS. There are four types of documents; Collection, Content Document, No-Content Document and Combined Document.

Document Handle: Corresponds to a particular view on a document, either the universal view, or that of one principal.

DocumentID: A unique identifier for each Base Document. A Reference Document inherits the DocumentID from its referent. Document identity is thus established via the connections between Reference Document References and Base Documents. Logically, a single document is a Base Document and any Reference Documents that refer to it.

Kernel: Manages all operations on a document. A principal may have more than one kernel.

Multi-Principal: Ability for multiple principals to have their own set of properties on a Base Document wherein the properties of each principal may be different.

Notification: Allows properties and external devices to find out about operations and events that occur elsewhere in DMS.

No Content Document: A document which contains only properties.

Off-the-Shelf Applications: Existing applications that use protocols and document storage mechanisms provided by currently existing operating systems.

Principal: A "User" of the document management system. Each person or thing that uses the document management system is a principal. A group of people can also be a principal. Principals are central because each property on a document can be associated with a principal. This allows different principals to have different perspectives on the same document.

Property: Some bit of information or behavior that can be attached to content. Adding properties to content does not change the content's identity. Properties are tags that can be placed on documents, each property has a name and a value (and optionally a set of methods that can be invoked).

Property Generator: Special case application to extract properties from the content of a document.

Reference Document: Corresponds to one principal's view of a document. It contains a reference to a Base Document (Reference Document A refers to Base Document B) and generally also contains additional properties. Properties added by a Reference Document belong only to that reference; for another principal to see these properties, it must explicitly request them. Thus, the view seen by a principal through his Reference Document is the document's content (through the Base Document), and a set of properties (both in the reference and on the Base Document). Even an owner of a Base Document can also have a Reference Document to that base, in which he places personal properties of the document that should not be considered an essential part of the document and placed in all other principal's view.

Space: The set of documents (base or references) owned by a principal.

Static Property: A name-value pair associated with the document. Unlike active properties, static properties have no behavior. Provides searchable meta-data information about a document.

Introduction

As discussed in the background of the invention, the structure that file systems provide for managing files becomes the structure by which users organize and interact with documents. However, documents and files are not the same thing. The present invention has as an immediate goal to separate management of properties related to the document or concerning the document from the management of the document content. Therefore, user-specific document properties are managed close to the document consumer or user of the document rather than where the document is stored. Separation of the management of user properties from the document content itself provides the ability to move control of document management from a closed file system concept to a user-based methodology.

FIG. 1 illustrates a distinction between hierarchical storage systems whose documents are organized in accordance with their location described by a hierarchical structure and the present invention where documents are organized according to their properties (e.g. author=dourish, type=paper, status=draft, etc.). This means documents will retain properties even when moved from one location to another, and that property assignment can have a fine granularity.

Figure 2:
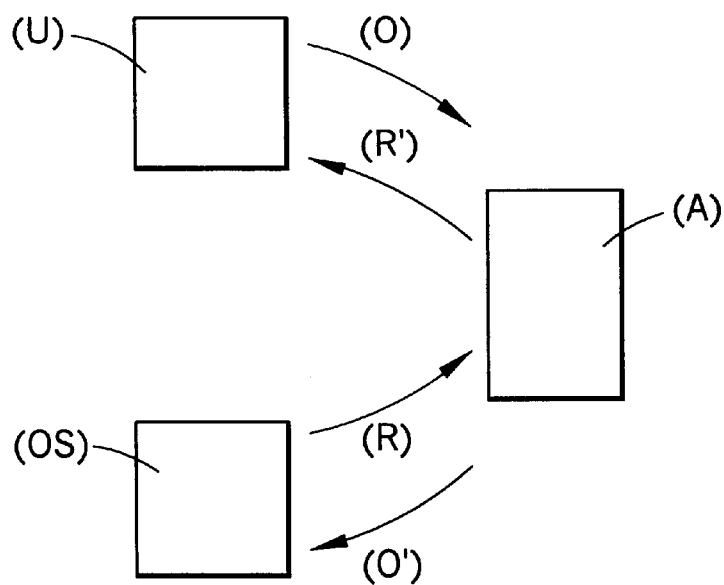
FIG. 2 is a block diagram of a document management system according to the present invention, interposed within a communication channel between a user and an operating system.

To integrate properties within the document management system of the present invention, the properties need to be presented within the content and/or property read/write path of a computer system, with the ability to both change the results of an operation as well as take other actions. The outline of the concept is described in FIG. 2, where once user (U) issues an operation request (O), prior to that operation being performed by operating system (OS), a call is made to document management system (DMS) A of the present invention, which allows DMS A to function so as to achieve the intended concepts of the present invention. This includes having DMS A interact with operating system (OS), through its own operation request (O'). Once operation request (O') is completed, the results are returned (R) to DMS A which in turn presents results (R') to user (U).

With these basic concepts having been presented, a more detailed discussion of the invention is set forth below.

Document Management System (DMS) Architecture

Figure 3:
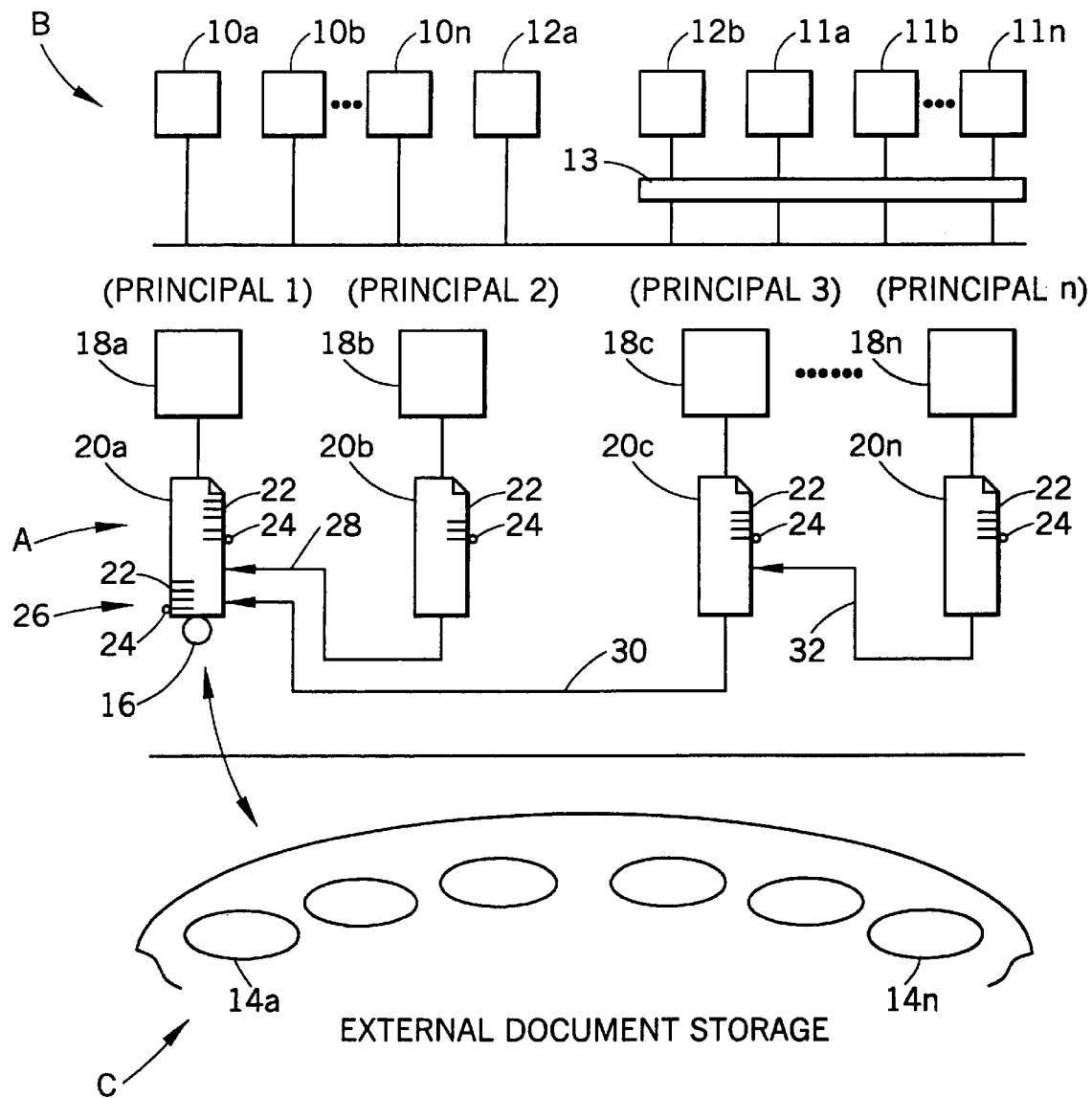
FIG. 3 is a representation of a document management system of the present invention implemented in a computer system.

FIG. 3 sets forth the architecture of a document management system (DMS) A of the present invention in greater detail. Document management system (DMS) A is shown configured for operation with front-end components B, and back-end components C. Front-end components B include applications 10a–10n and 11a–11n, such as word processing applications, mail applications among others. Some of the applications are considered DMS aware 10a–10n which means these applications understand DMS protocols for storing, retrieving and otherwise interacting with DMS A. Other components are considered non-DMS aware 11a–11n. Browsers 12a (DMS aware) and 12b (non-DMS aware) are considered specialized forms of applications. In order for the non-DMS-aware applications 11a–11n and 12b to be able to communicate with DMS A, front-end translator 13 is provided.

Similarly, back-end components C can include a plurality of repositories 14a–14n, where the content of documents are stored. Such repositories can include the hard disc of a principal's computer, a file system server, a web page, a dynamic real time data transmission source, as well as other data repositories. To retrieve data content from repositories 14a–14n, bit providers, such as bit provider 16, are used. These bit providers are provided with the capability to translate appropriate storage protocols.

Principals 1–n each have their own kernel 18a–18n for managing documents, such as documents 20a–20n. Documents 20a–20n are considered to be documents the corresponding principal 1–n has brought into its document management space. Particularly, they are documents that a principal considers to be of value and therefore has in some manner marked as a document of the principal. The document, for example, may be a document which the principal created, it may be an e-mail sent or received by the principal, a web page found by the principal, a real-time data input such as an electronic camera forwarding a continuous stream of images, or any other form of electronic data (including video, audio, text, etc.) brought into the DMS document space. Each of the documents 20a–20n have static properties 22 and/or active properties 24 placed thereon.

Document 20a, is considered to be a base document and is referenced by reference documents 20b–20c. As will be discussed in greater detail below, in addition to base document 20a having static properties 22 and/or active properties 24, base document 20a will also carry base properties 26 which can be static properties 22 and/or active properties 24. Static properties are shown with a "-" and active properties are shown with a "-o".

Reference documents 20b–20c are configured to interact with base document 20a. Both base documents and reference documents can also hold static properties 22 and/or active properties 24. When principals 2,3 access base document 20a for the first time, corresponding reference documents 20b–20c are created under kernels 18b–18c, respectively. Reference documents 20b–20c store links 28 and 30 to unambiguously identify their base document 20a. In particular, in the present invention each base document is stored with a document ID which is a unique identifier for that document. When reference documents 20b–20c are created, they generate links to the specific document ID of their base document. Alternatively, if principal n references reference document 20c, reference document 20n is created with a link 32 to reference document 20c of Principal 3. By this link principal n will be able to view (i.e. its document handle) the public properties principal 3 has attached to its reference document 20c as well as the base properties and public reference properties of base document 20a. This illustrates the concept of chaining.

The above described architecture allows for sharing and transmission of documents between principals and provides the flexibility needed for organizing documents. With continuing attention to FIG. 3, it is to be noted at this point that while links 28–30 are shown from one document to another, communication within DMS A is normally achieved by communication between kernels 18a–18n. Therefore, when DMS A communicates with either front-end components B, back-end components C, or communication occurs between principals within DMS A, this communication occurs through kernels 18a–18n. It is however, appreciated the invention will work with other communication configurations as well.

Using the described architecture, DMS A of the present invention does not require the principal to operate within a strict hierarchy such as in file or folder-type environments. Rather, properties 22,24 which are attached to documents allows a principal to search and organize documents in accordance with how the principal finds it most useful.

For instance, if principal 1 (owner of kernel 18a) creates a base document with content, and stores it within DMS A, and principal 2 (owner of kernel 18b) wishes to use that document and organize it in accordance with its own needs, principal 2 can place properties on Reference Document 20b. By placement of these properties, principal 2 can retrieve the base document in a manner different than that envisioned by principal 1.

Further, by interacting with browser 12, a principal may run a query requesting all documents having a selected property. Specifically, a user may run query language requests over existing properties.

Therefore, a point of the present invention is that DMS A manages a document space where properties are attached by different principals such that actions occur which are appropriate for a particular principal, and are not necessarily equivalent to the organizational structure of the original author of a document or even to other principals.

Another noted aspect of the present invention is that since the use of properties separates a document's inherent identity from its properties, from a principal's perspective, instead of requiring a document to reside on a single machine, documents in essence can reside on multiple machines (base document 20a can reside on all or any one of kernels 18a–18n). Further, since properties associated with a document follow the document created by a principal (for example, properties on document 20b of kernel 18b, may reference base document 20a), properties of document 20b will run on kernel 18b, even though the properties of document 20b are logically associated with base document 20a. Therefore, if a property associated with document 20b (which references base document 20a) incurs any costs due to its operation, those costs are borne by kernel 18b (i.e. principal 2), since properties are maintained with the principal who put the properties onto a document.

Support for Native Applications

A DMS document interface provides access to documents as Java objects. Applications can make use of this interface by importing the relevant package in their Java code, and coding to the API provided for accessing documents, collections and properties. This is the standard means to build new DMS-aware applications and to experiment with new interaction models. DMS Browser 12 (of FIG. 3) can be regarded as a DMS application and is built at this level. The DMS document interface provides Document and Property classes, with specialized subclasses supporting all the functionality described here (such as collections, access to WWW documents, etc.). Applications can provide a direct view of DMS documents, perhaps with a content-specific visualization, or can provide a wholly different interface, using DMS as a property-based document service back-end.

Support for Off-the-shelf Applications

Another level of access is through translators (such as translator 13 of FIG. 3). In an existing embodiment, a server implementing the NFS protocol is used as the translator. This is a native NFS server implementation in pure Java. The translator (or DMS NFS server) provides access to the DMS document space to any NFS client; the server is used to allow existing off-the-shelf applications such as Microsoft Word to make use of DMS documents; on PC's, DMS simply looks like another disk to these applications, while on UNIX machines, DMS A looks like part of the standard network filesystem.

Critically, though, what is achieved through this translator is that DMS A is directly in the content and property read/write path for existing or off-the-shelf applications. The alternative approach would be to attempt to post-process files written to a traditional filesystem by applications, such as Word, that could not be changed to accommodate DMS A. By instead providing a filesystem interface directly to these applications, it makes it possible to execute relevant properties on the content and property read/write path. Furthermore, it is ensured that relevant properties (such as ones which record when the document was last used or modified) are kept up-to-date. Even though the application is written to use filesystem information, the DMS database remains up to date, because DMS A is the filesystem.

As part of its interface to the DMS database layer, NFS provides access to the query mechanism. Appropriately formatted directory names are interpreted as queries, which appear to "contain" the documents returned by the query. Although DMS provides this NFS service, DMS is not a storage layer. Documents actually live in other repositories. However, using the NFS layer provides uniform access to a variety of other repositories (so that documents available over the Web appear in the same space as documents in a networked file system). The combination of this uniformity along with the ability to update document properties by being in the read and write path makes the NFS service a valuable component for the desired level of integration with familiar applications. It is to be appreciated that while a server implementing NFS protocol is discussed other servers could also be used.

Property Attachment

Figure 4:
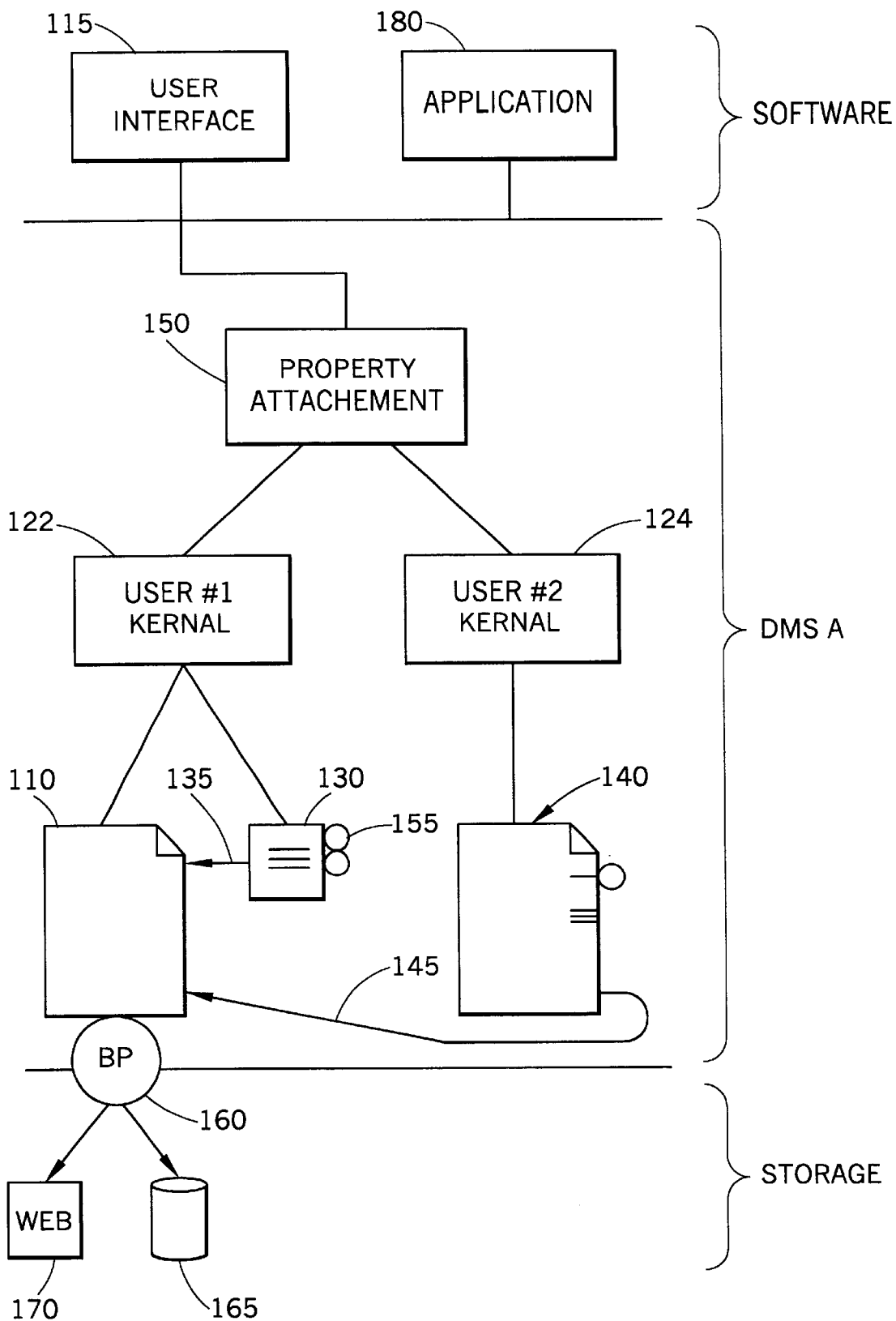
FIG. 4 is a configuration of the present document management system which allows properties to be attached to documents.

FIG. 4 shows an overall system for attaching properties to a document 110. A user interface 115 allows a user to select a desired document and select one or more properties to be attached to the selected document. The document management system A locates and retrieves the selected document in accordance with its management system protocol. In the Preferred Embodiment, documents are stored and retrieved based on their properties rather than hierarchial path and file names.

In FIG. 4, the selected document 110 is found to be owned by user #1. However, the user wishing to attach a property to document 110 can be any user in the system. The document management system A maintains properties on a per user per document basis using individual kernels. Kernel 122 manages documents and properties for user #1 and kernel 124 manages documents and properties for user #2. Thus, a user #1 can generate a set of properties 130 for document 110 (associated via link 135) which are independent from the properties 140 of user #2 (associated via link 145) for document 110.

A property attachment mechanism 150 is provided by the document management system A which generates, configures and attaches properties 130 to the document 110 represented by association links 135. In the preferred embodiment, the document 110 is identified by a unique ID and the property references the document using the same unique ID. The properties 130 include static properties (represented by horizontal lines) and active properties (represented by circles). Static properties are simple name-value pairs on documents which are relevant to a user, for example, "author=Joe" or "topic=interesting." An active property 155 has a name-value and includes executable program code and/or instructions for automatically performing an operation or service without a user's involvement. Documents can be collected, searched and retrieved based on static properties and/or active properties.

The active property 155 is configured to be activated by a triggering event which is defined by the user. Attaching the active property 155 to the document 110 forms an association between the property and the document. The association is external to the data that represents the content of the document 110. Thus, the association is independent of content type, the application format used to generate the document, and other characteristics of the document 110. The content of document 110 is controlled by a bit provider 160 which identifies the location of the data (e.g. local disk 165, world wide web 170, a camera, or any data supplying source), indicates how the data from the sources are combined to form the content of the document 110, includes a translation interface to communicate to the data source, and other selected parameters which define the content.

Dynamic System Configuration

Figure 5:
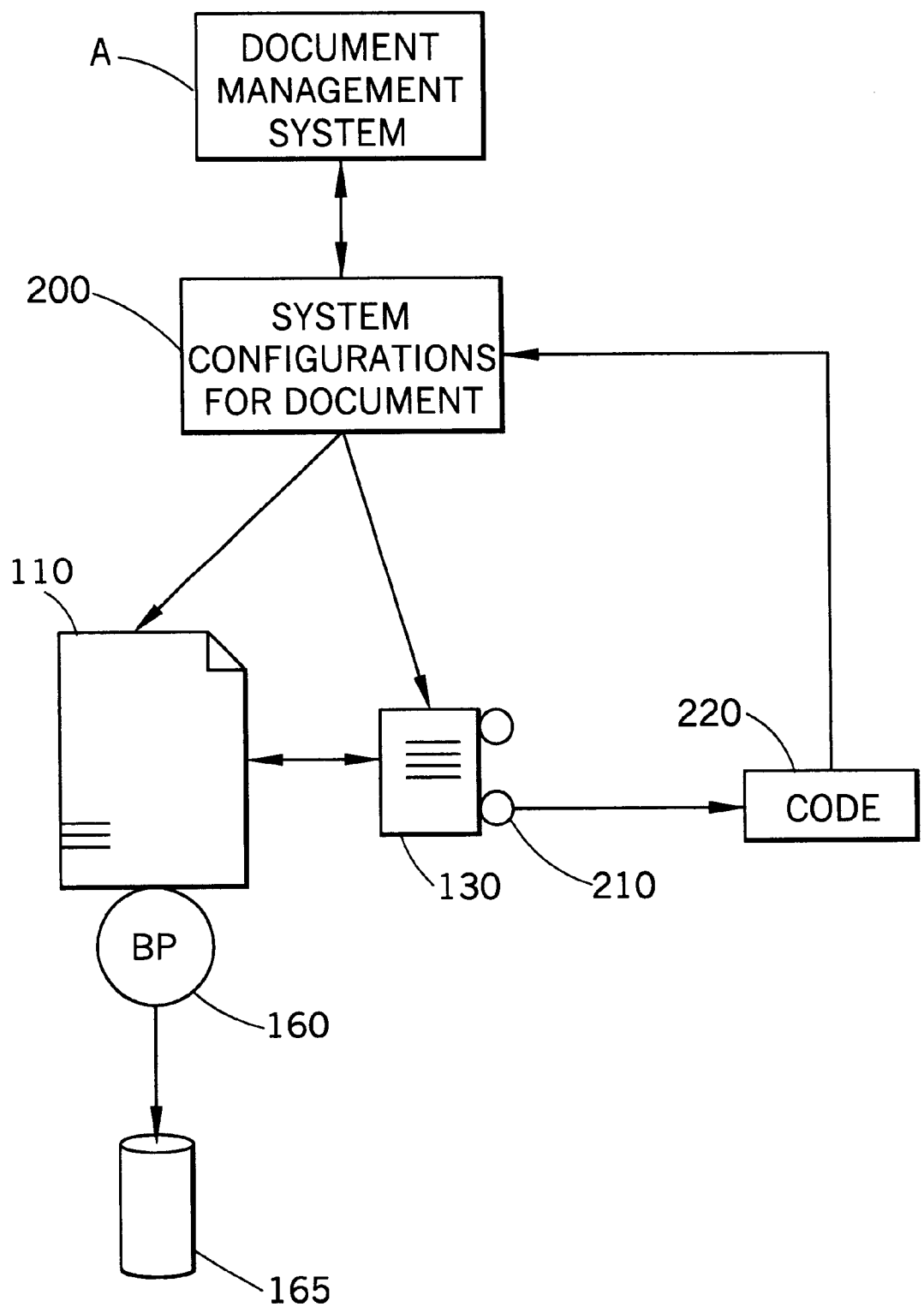
FIG. 5 illustrates a document having attached properties which change system configurations in accordance with the present invention.

With reference to FIG. 5, in the Preferred Embodiment, active properties attached to document 110 are configured to dynamically change system configurations and/or parameters 200 which control the manner that the document management system A manages document 110. Active property 210 is attached to document 110 and includes executable code 220. The code 220 is a pre-coded routine or program written to set specific configuration settings or to change system configurations and requirements in response to current or desired states of the system. The pre-coded routines may use values of static properties from the document as parameters to the configuration management step. The code 220 can be provided by a commercial supplier or can be written by a user having system programming skills. It is, however, beyond the scope of the present invention to describe the specific programming involved to change system configurations since it is different for each environment and each configuration.

Examples of the types of system configuration decisions that users often need to make include: where to locate a file/document, e.g. in what directory or what file server; where to maintain file caches and what to cache; how access controls should be set, what access control groups are created, etc; which files/documents to backup; whether backups should be kept on-line or off-line; how many replicas of a file to create and where to place them; what sort of consistency to maintain between replicas, e.g. how often replicas should reconcile with each other. These decisions in turn affect the performance, availability, and security of the system and its documents.

In the preferred embodiment, active properties provide a unifying abstraction for expressing many different configuration desires and interfacing to different mechanisms for establishing the desired configuration identified in the property. By attaching active properties to change a document's configuration, a user can express high-level desires and requirements, such as "make this document maximally available for less than $0.01/Kbyte/month" or "share this document with my group," instead of (or in addition to) having a working knowledge of specific configuration settings. Active properties and their executable code can also change the system configuration and requirements over time in response to changing environment, usage, or market conditions without requiring human intervention to meet the requirements.

In prior systems, the process of configuring, and reconfiguring an existing system configuration in response to new or changing user needs, is generally quite tedious and error-prone. Consider the example of trying to share a newly created file within a project group. The user creating the file needs to place the file on a shared file server, possibly set up an access control group for the project members, set the file's access control list to ensure read access by this group and do the same for the directory in which the file was stored, etc. Each of these steps requires using different interfaces to different system components and likely requires the user to have deep knowledge of how these components operate.

With further reference to FIG. 5, the present system simplifies the configuration process. A user simply attaches a property 210 to the document 110 which identifies a desired configuration for the document 110 such as "located on a file server A", "readable by project group B", etc. The implementation of each of these properties is pre-coded in a program 220 which executes the tasks involved in placing the file on the desired file server, setting the appropriate access controls, etc. The details of how the program 220 performs the configurations could vary depending on the type of the server, but the user does not need to be familiar with these details. In other words, by attaching properties, like property 210 to document 110, a uniform, easy-to-use interface for managing file directories, access control lists, hoard profiles, and other system configurations 200, which the document management system A uses to manage document 110, is provided.

With further reference to FIG. 5, a description of how a user configures a document to dynamically change its own system configurations is provided. A user selects document 110 having a specific system configuration or requirement for the document. The user attaches an active property 210 to the document reference 130 of document 110. For exemplary purposes, the user selects a desired setting of "share with Joe" as the value of the property 210. The property 210 becomes an active property when it is configured to control a behavior through the use of executable code 220. In this case, code 220 is a pre-coded routine or program which is designed to change access controls to documents such that document 110 can be shared by other users such as Joe.

The document management system A controls and manages document 110 in accordance with a set of system configurations 200 defined for the document 110. Based on the property "share with Joe", the code 220 dynamically changes the system configurations 200 for document 110. The code 220 may simply change an access control parameter in the configuration 200 or it could decide how best to satisfy the requested configuration based on a current state of the system or a desired future state.

For example, code 220 can include intelligence to decide that the best way to share document 110 with Joe is to place a copy on a shared file server and give Joe read access to it. Or, the system can decide, based on some profile information maintained about Joe, that Joe would prefer to receive the document 110 via e-mail. Overall, there are different ways to meet the "share with Joe" property, and it is the code and system that decide on the best course of action based on a variety of inputs. The "share with Joe" property may cause different actions to take place than a "share with Mary" property even though they look quite similar to the user who attaches these properties. Again, the specific implementations of code 220 is beyond the scope of the present disclosure. The foregoing examples illustrate the difficulties involved for a user in changing document configurations without using the active property mechanism of the present invention.

Figure 6:
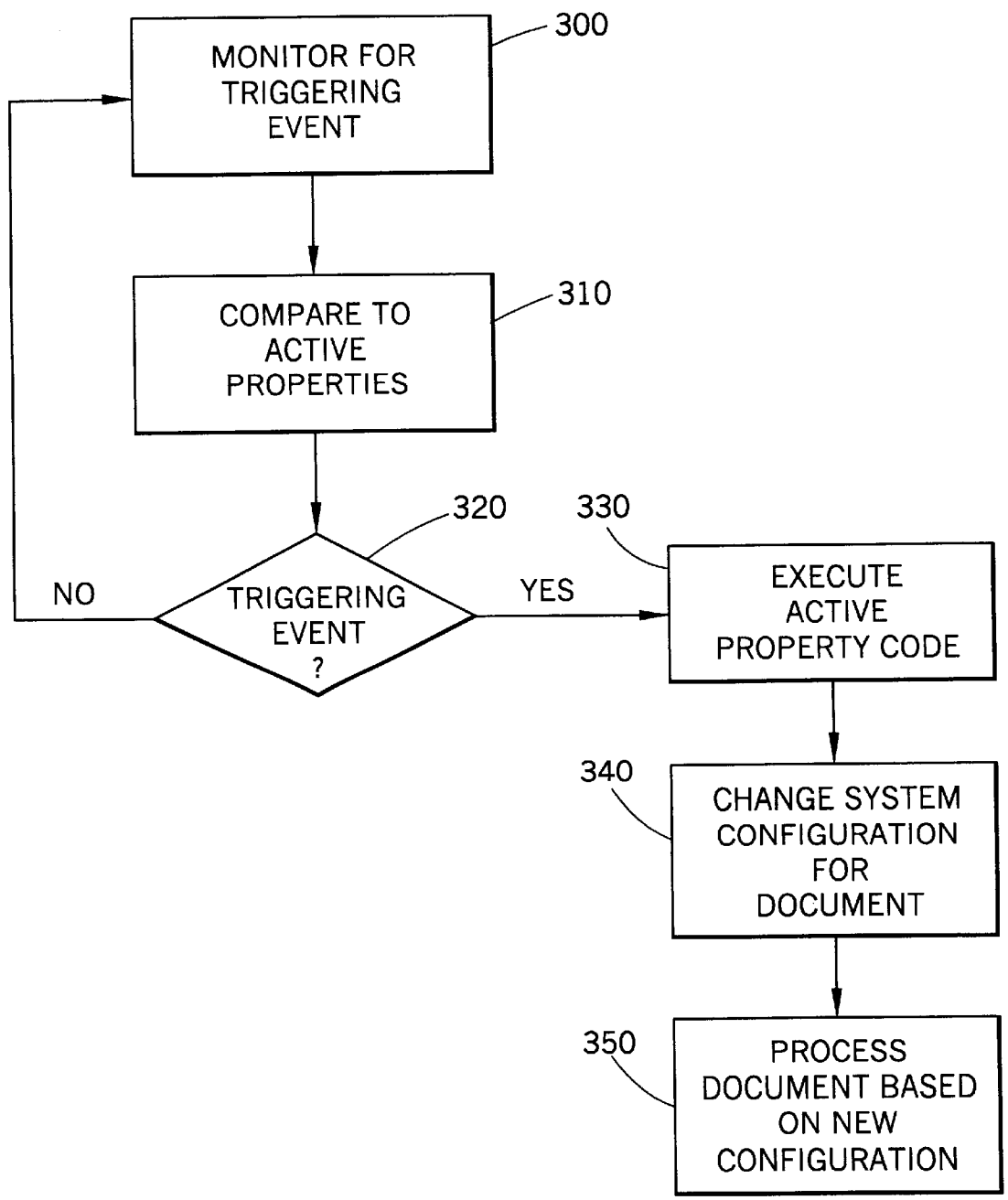
FIG. 6 illustrates an exemplary block diagram for triggering an active property in accordance with the present invention.

With reference to FIG. 6, a method and system for activating active properties and executing code 220 is provided. As previously explained, active properties are configured to be activated by the occurrence of a triggering event which is assigned to the active property by the user. In order to detect a triggering event, the document management system A monitors 300 the system for triggering events. A triggering event can be defined by the user to be any operation or event such as one that is initiated by an application, by the system, by a system parameter, by another document, by another active property, by a timer or any mechanism desired by a user. When an event is detected, it is compared 310 to the active properties of document 110 and a determination 320 is made whether the event is a triggering event assigned to one or more of the properties in the document reference 130. If the event is a triggering event, the corresponding active property is activated to execute 330 its active property code. The code then dynamically changes 340 the selected system configuration 200 for document 110 to include the desired configuration identified by the active property. Upon completion of the code, document 110 is controlled 350 by the document management system A in accordance with the new system configuration for document 110.

By way of another example, consider the "make this document maximally available for less than $0.01/Kbyte/month" property. This is a statement of what the user desires, not how to provide it. The user doesn't care whether the file is replicated on servers A and B or C, D, and E as long as the user receives good availability for the right price. The algorithm for maximizing the document's availability could be quite complex. It needs to take into account the failure rates of various servers and the network connections leading to them, the cost of storing data on these servers, and the places from which the user is likely to access the document. It might also need to take into account other documents since each server has a limited storage capacity. While designing a good algorithm to change a configuration is not easy, designing it once and attaching it to documents as a property is a much better approach than requiring each user to design the algorithm every time they create a document or wish to change a configuration.

Another advantage of expressing configuration desires as high-level properties is that the system can reconfigure itself automatically to ensure that it continually meets the stated desires. Once again, consider the "make this document maximally available for less than $0.01/Kbyte/month" property. If the user's access patterns to the document changes, the system may need to change its configuration. Suppose, for example, that the user buys a new laptop from which it starts regularly accessing documents. The system could decide to automatically replicate some of these documents on to the user's laptop, especially if the user occasionally disconnects his laptop. Suppose some machine becomes flaky. The system may decide to stop using this machine as a storage server. Suppose some new storage server comes on-line and offers lower prices. The system may decide to use this new service. And, because it can now store documents more cheaply, it may decide to replicate documents on additional servers for even greater availability. This is but one example of the many complex reconfiguration tasks that a user cannot possibly be expected to do but, however, are reasonable to do with the present invention by attaching active properties on documents.

In summary, the key benefits of using active properties to configure a system comes from the separation of what characteristics users want for documents from what specific configuration parameters to set and choices to make. This separation simplifies life for the users since they need not be aware of the details and heterogeneous nature of the underlying system. The present invention also provides better service to users since active properties can change the system configuration in response to changes in the environment without burdening the user.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, we now claim:

1. A method of dynamically changing a system configuration that controls the manner in which a document management system manages a document, in a document management system which organizes, stores, and retrieves documents according to properties attached to the documents, the method, comprising the steps of:

attaching a property to the document, the property identifying a desired document management system configuration for the document;

assigning executable code to the property for dynamically changing the document management system configurations, the document property including the desired configuration;

assigning a triggering event to the property such that the property invokes the executable code in response to the triggering event; and, upon an occurrence of the triggering event, invoking the executable code of the property and dynamically changing the document management system configuration to include the desired configuration.

2. The method as set forth in claim 1 further including:

attaching static properties to the document which define parameters for the desired document configuration; and, attaching active properties to the document which invoke the executable code for the desired document management system configuration in response to the triggering event.

3. The method as set forth in claim 2 wherein the executable code dynamically changes the document management system configuration based on the parameters defined by the active properties of the document.

4. A method of managing documents which change system configurations in a computer system comprising the steps of:

(a) forming a document, having a computer system configuration relating to the management of the document, including:

providing a pre-coded executable routine to the document for selecting a computer system configuration relating to said document;

attaching a property to the document, the property being assigned a triggering event for activating the property; and, loading the property with the pre-coded routine such that when the property is activated, the property executes the pre-coded routine to provide the selected computer system configuration for the document; and, (b) dynamically changing the system configuration affecting the document including:

monitoring for the triggering event; and, activating the property attached to the document in response to the triggering events, executing the pre-coded routine, the pre-coded routine dynamically changing the computer system configuration to a configuration desired by the document.

5. The method as set forth in claim 4 further including:

attaching static properties to the document which define parameters for the selected computer system configuration; and, attaching active properties to the document which invoke the pre-coded executable routine in response to the triggering event.

6. The method as set forth in claim 5 wherein the pre-coded executable routine dynamically changes the computer system configuration based on the parameters defined by the active properties.

* * * * *